United States Patent [19]

Purcell

[11] Patent Number: 5,334,106
[45] Date of Patent: Aug. 2, 1994

[54] HYDRAULIC RECOIL AND BELT TENSION CONTROL SYSTEM

[75] Inventor: Robert J. Purcell, Washington, Ill.

[73] Assignee: Caterpillar Inc., Peoria, Ill.

[21] Appl. No.: 57,396

[22] Filed: May 6, 1993

[51] Int. Cl.[5] ............................................. F16H 7/00
[52] U.S. Cl. ...................................... 474/110; 305/10
[58] Field of Search ............... 474/101, 109, 110, 111, 474/113, 117, 133, 135, 136, 138; 305/10

[56] References Cited

U.S. PATENT DOCUMENTS

| | | | |
|---|---|---|---|
| 3,310,127 | 3/1967 | Siber et al. | 180/9.2 |
| 3,327,798 | 6/1967 | Siber et al. | 180/6.7 |
| 3,901,563 | 8/1975 | Day | 474/110 X |
| 3,972,569 | 8/1976 | Bricknell | 305/10 |
| 4,543,079 | 9/1985 | Matsuda et al. | 474/110 X |
| 4,893,883 | 1/1990 | Satzler | 305/10 |
| 5,176,581 | 1/1993 | Kumm | 474/110 |
| 5,254,047 | 10/1993 | Anderson | 474/110 |

*Primary Examiner*—Thuy M. Bui
*Attorney, Agent, or Firm*—John W. Grant

[57] ABSTRACT

A hydraulic recoil and belt tension control system is connected to a hydraulic motor of an endless belt propulsion device so that a common source of fluid is used to both drive the hydraulic motor and maintain proper tension in a drive belt of the propulsion device. The hydraulic recoil and belt tension control system includes first and second check valves to direct pressurized fluid from the appropriate one of first and second motor conduits to an actuating chamber of a belt tension actuator. A relief valve relieves excessive pressure in the actuating chamber and returns fluid exhausted from the actuating chamber during recoil through either of third and fourth check valves to the appropriate one of the first and second motor conduits. Utilizing the hydraulic motor drive circuit as the source of fluid for the hydraulic recoil and belt tension control systems eliminates at least two conduits between the propulsion device and the vehicle to which the propulsion device is mounted.

5 Claims, 2 Drawing Sheets

5,334,106

HYDRAULIC RECOIL AND BELT TENSION CONTROL SYSTEM

TECHNICAL FIELD

This invention relates generally to a endless belt vehicular propulsion device and more particularly to a hydraulic recoil and belt tension control system for maintaining tension in the endless drive belt.

BACKGROUND ART

The drive belt used on belt driven vehicles are normally entrained about a drive wheel and an idler wheel. In a frictionally driven endless belt propulsion system, the frictional couple between the endless belt and the drive wheel for driving the belt is dependant upon maintaining appropriate tension in the belt. Thus, the idler wheel is generally movable in a fore and aft direction relative to the drive wheel for controlling the tension in the drive belt. A recoil device is normally employed for the dual function of biasing the idler wheel in a forward direction to maintain the appropriate tension in the belt and permitting the idler wheel to recoil rearwardly against the biasing force to prevent over tensioning of the belt upon ingestion of debris between the belt and drive wheel or idler wheel. Some recoil systems use a linear actuator for controlling the fore and aft movement of the idler wheel and a hydraulic control system for maintaining a desired fluid pressure in the hydraulic actuator. Pressurizing the hydraulic actuator to the desired fluid pressure generates the appropriate tension in the belt.

One of the problems encountered in the heretofore known hydraulic recoil and belt tensioning systems is that the source of fluid for controlling the tension is generally an implement pump mounted on the vehicle to which the endless belt propulsion system is mounted. That control arrangement thus requires at least two conduits extending between the vehicle and the propulsion system for carrying fluid to and from the recoil system. Moreover, many of the endless belt propulsion systems are powered by a hydraulic motor connected to the drive wheel and, thus, at least two additional lines are required for carrying fluid between the vehicle and the drive motor.

The present invention relates to a hydraulic recoil and belt tension control system which utilizes the hydraulic motor drive circuit as the source of fluid thereby eliminating at least two hydraulic lines extending between the vehicle and the endless belt propulsion system.

The present invention is directed to overcoming one or more of the problems as set forth above.

DISCLOSURE OF THE INVENTION

In one aspect of the present invention, a hydraulic recoil and belt tension control system is provided for an endless belt propulsion device having a drive wheel, a reversible hydraulic motor drivingly connected to the drive wheel and having a first motor conduit adapted to receive pressurized fluid to drive the motor in a first direction and a second motor conduit adapted to receive pressurized fluid to drive the motor in a second direction, an idler wheel movable relative to the drive wheel, and an endless belt entrained around the drive and idler wheels. The system comprises a hydraulic actuator having first and second actuating chambers, and a piston rod operatively connected to the idler wheel, a first check valve disposed between the first motor conduit and the first actuating chamber, a second check valve disposed between the second motor conduit and the first actuating chamber and a relief valve connected to the first actuating chamber.

BEST MODE FOR CARRYING OUT THE INVENTION

Figure 1:
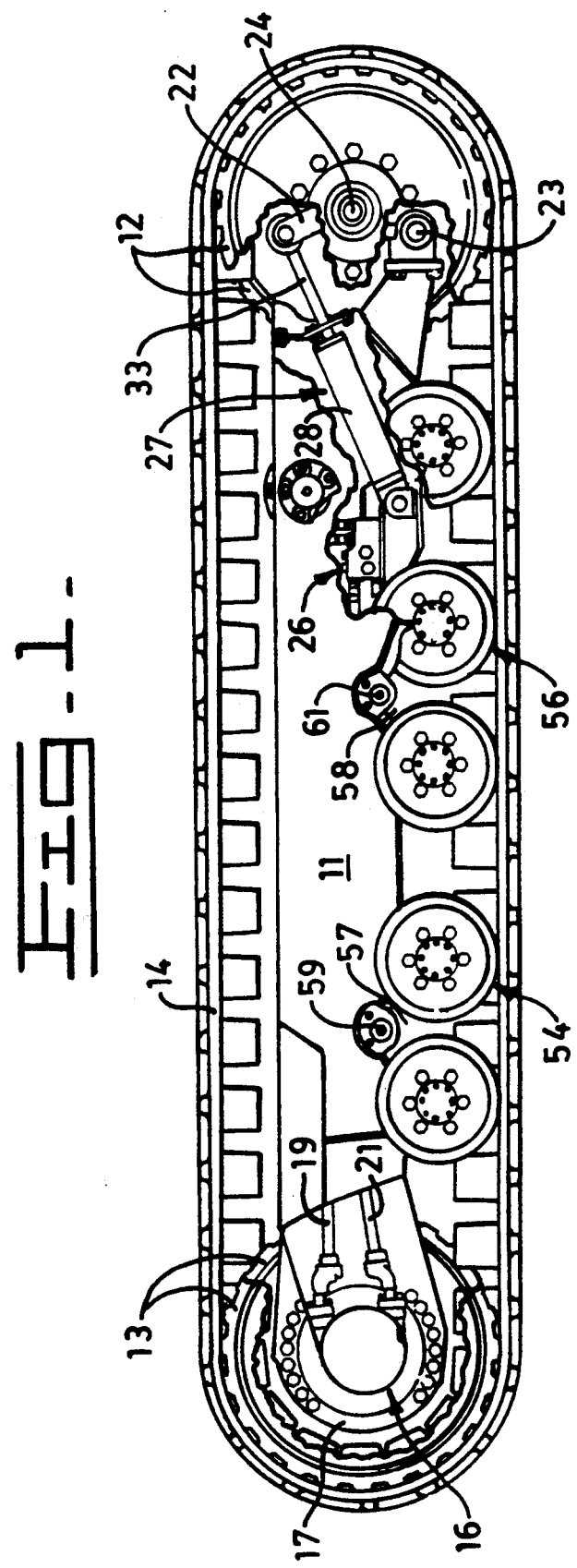
FIG. 1 is a side elevational view of an exemplary endless belt propulsion device employing an embodiment of the present invention.

An endless belt propulsion device 10 includes an elongate hollow support frame 11, a pair of laterally spaced idler wheels 12, a pair of laterally spaced drive wheels 13 and an endless drive belt 14 entrained around the idler and drive wheels 12,13. A reversible hydraulic motor 16 has a housing 17 suitably mounted to the rearward end of the support frame 11 and a driveshaft (not shown) suitably drivingly connected to the pair of drive wheels 13. The motor has a first motor conduit 19 for receiving pressurized fluid from an external source to drive the hydraulic motor in a first direction and a second motor conduit 21 for receiving pressurized fluid from the external fluid source for driving the motor in a second opposite direction. An idler wheel support lever 22 is positioned between the idler wheels 12 and is pivotally connected at a pivot 23 to the forward end of the support frame 11 extending between the idler wheels. The idler wheels 12 are suitably rotatably mounted to the support lever 22 by means of a shaft 24.

Figure 2:
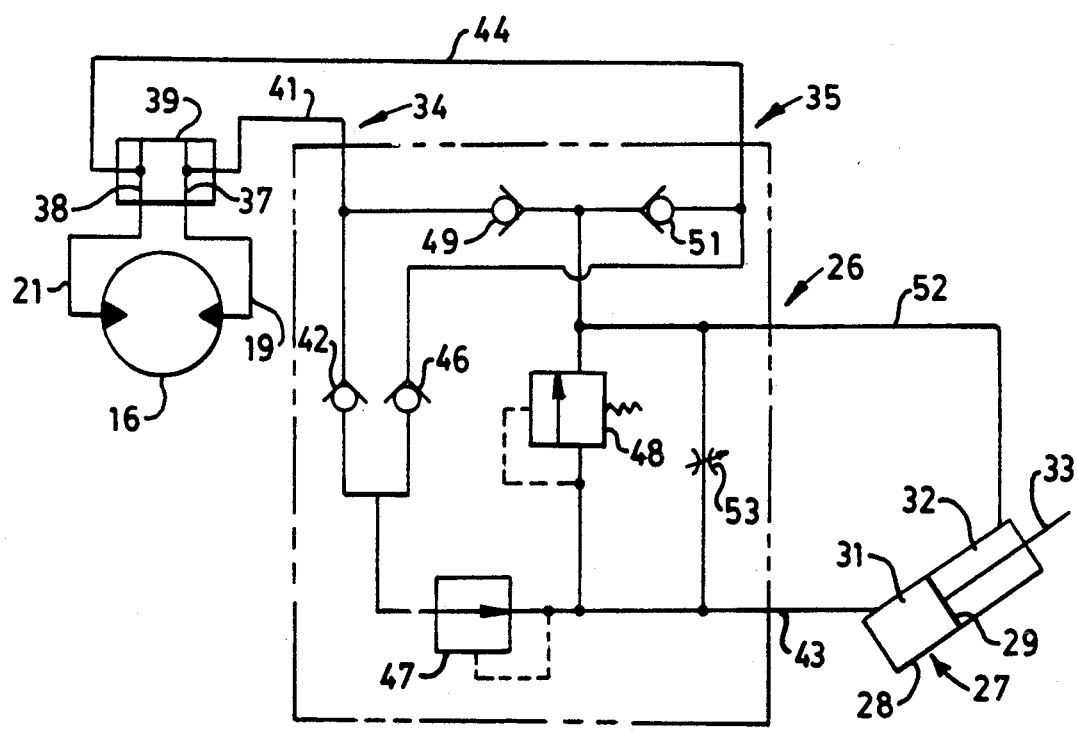
FIG. 2 is a schematic illustration of the control system of the present invention.

A hydraulic recoil and belt tensioning control system 26 is schematically shown on FIG. 2 and includes a hydraulic belt tension actuator 27 having a cylinder 28 pivotally connected to the support frame 11, a piston 29 slidable in the cylinder 28 defining a head end chamber 31 and a rod end chamber 32, and a piston rod 33 connected to the piston 29 and being pivotally connected to the distal end of the support lever 22.

The control system 26 also includes a first means 34 for providing one-way fluid communication from the first motor conduit 19 to the head end chamber 31 when the motor is driven in a first direction, and a second means 35 for providing one-way fluid communication from the second motor conduit 21 to the head end chamber 31 when the motor 16 is driven in a second direction. The first and second motor conduits 19,21 are connected to a pair of passages 37,38 in a junction block 39 suitably mounted to the support frame 11. The first means 34 includes the passage 37 and a conduit 41, a check valve 42 and a conduit 43 arranged in series between the passage 37 and the head end chamber 31. The second means 35 includes the passage 38 and a conduit 44, a check valve 46 and the conduit 43 arranged in series between the passage 38 and the head end chamber 31.

A pressure reducing valve 47 is disposed between the check valves 42,46 and the conduit 43. A relief valve 48 is connected to the conduit 43. A pair of check valves 49, 51 connect the downstream side of the relief valve 48 to the conduits 41 and 44, respectfully. A conduit 52 connects the rod end chamber 32 to the check valves 49,51 which provide one-way fluid communication from the rod end chamber to first and second motor conduits 19 and 21 respectfully. An adjustable orifice 53 is arranged in parallel to the relief valve 48 between the conduits 43 and 52.

First and second sets of bogie roller wheels 54,56 are rotatably mounted to first and second bogie support arms 57,58 which are pivotally mounted to the frame 11 by a pair of pivots 59,61. An additional roller wheel 62 is rotatably mounted to the support frame 11 intermediate the second set of bogie roller wheels 56 and the idler wheels 12 to stabilize the forward portion of the propulsion apparatus 10.

Industrial Applicability

In operation, a source of fluid (not shown) is connected to the junction block 39 for selectively driving the motor 16 in the first and second directions. When the motor is driven in the first direction pressurized fluid from the source is directed through the passage 37 while the fluid exhausted through the passage 38 is returned at low pressure to the source. The pressurized fluid in the passage 37 also passes through the conduit 41, the check valve 42, the pressure reducing valve 47 and the conduit 43 to the head end chamber 31 of the actuator 27. The pressurized fluid in the chamber 31 pivots the support lever 22 about the pivot 23 thereby moving the idler wheels 12 forwardly to generate tension in the drive belt 14. The amount of tension is determined by the pressure setting of the pressure reducing valve 47. Any fluid exhausted from the rod end chamber 32 passes through the conduit 52, the check valve 51, the conduit 44 and into the passage 38 where it is returned to the source of fluid. Conversely, when the motor is driven in the second direction, pressurized fluid passes through the conduit 44, the check valve 46, the pressure reducing valve 47 and the conduit 43 into the head end chamber. Fluid exhausted from the rod end chamber 32 passes through the conduit 52, the check valve 49 and the conduit 41 to the passage 37 where it is returned to the source of fluid.

A recoil function is provided by the relief valve 48. More specifically, should foreign matter become trapped between the drive belt 14 and the idler wheels of the drive wheels, the support lever 22 pivots counterclockwise about the pivot 23 causing the piston rod 33 to retract into the actuator 27. When the fluid pressure in the head end chamber 31 exceeds the setting of the relief valve 48, the relief valve opens to relieve the pressure. Some of the fluid passing through the relief valve 48 is returned to the rod end chamber 32 while the remaining fluid passes through the appropriate check valve 49 or 51 to the low pressure side of the hydraulic motor.

The adjustable orifice 53 is normally closed to isolate the head and rod end chambers during operation and maintains pressurized fluid in the head end chamber when the system is shut down. Opening the adjustable orifice 53 when the system is shut down relives the pressure in the head end chamber so that the idler wheels 12 can be moved rearwardly for removal of the belt 14.

In view of the above, it is readily apparent that the structure of the present invention provides an improved hydraulic recoil and belt tension control system which eliminates the need for at least two hydraulic conduits between the endless belt propulsion device 10 and the vehicle to which the propulsion device is attached. This is accomplished by using the motor drive circuit as the source of fluid for the control system.

Other aspects, objects and advantages of this invention can be obtained from a study of the drawings, the disclosure and the appended claims.

What is claimed is:

1. A hydraulic recoil and belt tension control system for an endless belt propulsion device having a drive wheel, a reversible hydraulic motor drivingly connected to the drive wheel, a first motor conduit adapted to receive pressurized fluid to drive the motor in a first direction, a second motor conduit adapted to receive pressurized fluid to drive the motor in a second direction, an idler wheel movable relative to the drive wheel, and an endless drive belt entrained around the drive and idler wheels, comprising:

an hydraulic actuator having first and second actuating chambers and a piston rod operatively connected to the idler wheel;

a first check valve disposed between the first motor conduit and the first actuating chamber;

a second check valve disposed between the second motor conduit and the first actuating chamber; and a relief valve connected to the first actuating chamber.

2. The hydraulic recoil and belt tension control system of claim 1 including a pressure reducing valve disposed between the check valves and the first actuating chamber.

3. The hydraulic recoil and belt tension control system of claim 2 including a third check valve connecting the relief valve to the first motor conduit and a fourth check valve connecting the relief valve at the second motor conduit.

4. The hydraulic recoil and belt tensioning system of claim 3 wherein the second actuating chamber is connected to the downstream side of the relief valve and the third and fourth check valves.

5. The hydraulic recoil and belt tension control system of claim 4 including an adjustable orifice connected between the first and second actuating chambers.

* * * * *